United States Patent Office 3,677,976
Patented July 18, 1972

3,677,976
COMMERCIALLY USEFUL POLYPHENYLENE POLYMERS AND METHOD OF PRODUCTION THEREOF
Leroy J. Miller, Canoga Park, and Norman Bilow, Los Angeles, Calif., assignors to Hughes Aircraft Company, Culver City, Calif.
No Drawing. Continuation-in-part of application Ser. No. 349,770, Mar. 5, 1964. This application Apr. 9, 1970, Ser. No. 27,178
The portion of the term of the patent subsequent to Feb. 23, 1988, has been disclaimed
Int. Cl. C08g 33/00
U.S. Cl. 260—2 H                    11 Claims

ABSTRACT OF THE DISCLOSURE

Commercially useful, fusible and tractable polyphenylene polymers and method of preparing the same from monomers of biphenyl, terphenyls, quaterphenyls, and mixtures thereof, and mixtures of same with other aromatic material as aromatic monomers, oligomers and polymers with 5 or less aromatic rings, prepared with a Lewis acid catalyst and oxidant combination.

---

The invention herein described was made in the course of or under a contract with the Air Force.

This application is a continuation-in-part of our application Ser. No. 349,770 filed Mar. 5, 1964 (now abandoned) and continuation-in-part application Ser. No. 665,262, filed Sept. 5, 1967, now abandoned, and related to the copending applications herewith filed, entitled "Process for Preparing Improved Phenylene Polymer Lacquers and Products," Ser. No. 665,286 (Pat. No. 3,560,428); "Method of Providing Useful Heat-Setting Aromatic Polymer Resinous Compositions and Products," Ser. No. 665,578 (Pat. No. 3,555,108); and "Aromatic Resinous Curing System and Method," Ser. No. 665,303 (abandoned, now C.I.P. Serial No. 69,169), likewise assigned to Hughes Aircraft Company, assignee.

This invention relates to new and useful fabricable plastic polyphenylene polymeric materials of a mean molecular weight on the order of 1000±500 to about 5000 and having a C:H atom ratio of 1.43 to 1.7 (of and about 1.5) and the method of their preparation with a Lewis acid catalyst and oxidant combination, from biphenyl, and preferably, terphenyls other than para-terphenyl per se, quaterphenyls other than para-quaterphenyl, suitable isomers of the terphenyls or quaterphenyls and mixtures thereof. More particularly, the invention herein relates to the discovery of economically useful tractable and fusible polyphenylene polymeric plastic materials, preferably of a molecular weight about 800 to about 3000 having a C:H atom ratio of and about 1.5, produced from biphenyl, ortho-terphenyl, meta-terphenyl, and isomeric quaterphenyls, including 2,2'- 2,4'-, 2,3'-, 3,3'-, and 3,4'-diphenylbiphenyl, 1,23-, 1,2,4-, and 1,3,5 - triphenylbenzene, and mixtures thereof, and polymerizable mixtures of one or more of these compounds with other unalkylated aromatic monomers, phenylene oligomers, polyphenyls, and mixtures thereof with not more than 5 and preferably not more than 4 aromatic rings, including the method of producing such polyphenylene polymers therefrom with a combination of a strong anhydrous Lewis acid catalyst and substantially anhydrous oxidant, at a temperature of about 90° C. to about 180° C. and preferably reacted in a temperature range of 100° C. to 135° C. from a few minutes to a few hours as hereinafter exemplified.

Other phenylene polymers have been prepared from other starting materials, but they have invariably been unsuitable for the purposes of producing coatings and laminated or molded structures of high thermal stability. The reason for this is that the polyphenylenes or polyphenyls in the previous art have either been of undesirable molecular weight, or alkylated and of different structural characteristics, or have consisted in part of other groups readily susceptible to thermal decomposition, or have been almost completely, if not totally, infusible and insoluble, or unsuitable for feasible use in applicable organic solvents. In those cases where the polymers of the previous art were fusible, the fusibility was due to the presence of undesirable groups, such as aliphatic, alicyclic, or olefinic groups in the polymer. Often these aliphatic groups or undesirable moieties were formed during the course of a polymerization and the reduced polymers thus had carbon:hydrogen atom ratios of significantly less than 1.5. A polyphenylene of the structure provided herein has a carbon:hydrogen atom ratio of and about 1.5, and between the limits of 1.43 to 1.70. Due to the aliphatic groups in the many different polyphenylenes of the previous art, they never possessed the thermal stability of a nonalkylated polyphenylene. Reduced polyphenylenes of this type, for example, are always obtained when the polymers are prepared by Wurtz-Fittig reactions of haloaromatics with alkali metals.

Para-polyphenylenes, prepared by polymerization of benzene, have been obtained by several investigators and molecular weights were reported to be as high as 5,000–10,000. Para-polymers, or p-polyphenyls, as prepared by polymerizing benzene, are, however, infusible and almost completely intractable or highly insoluble in organic solvents, as hot to boiling mono-, di-, and trihalobenzene material in the nature of bromobenzene or chlorobenzene, and the like, or chloroform, tetrachloroethane, and the like solvents in which the products herein accomplished and described are soluble. Fusible and soluble (tractable) para-polyphenylenes of high and useful molecular weight have never been obtained. This is theoretically due to the extremely strong van der Waals forces which the linear molecular structure allows. Infusible, intractable parapolyphenylenes thus are quite unsuitable for use in fabricating molded and laminated structures even with heat and pressure.

Various other polyphenylenes in the prior art have been prepared from nitrogen-containing monomers through reactions such as diazotizations or nitrosations. Polyphenylenes of these types invariably contain non-heterocyclic nitrogen, are not completely aromatic, and the polymers exhibit thermal stabilities far inferior to the polyphenylenes, described herein. The known designated polyphenyls are either infusible and insoluble in organic solvents, or if they are fusible and soluble, they have groups or substituents which drastically reduce their thermal stability and make them much less thermally stable than the polyphenylene polymers, as herein provided.

The polyphenylenes of this invention are believed to owe their fusibility and tractability to the presence of branches consisting primarily of phenyl and/or biphenyl groups on the main polyphenylene chains which are essentially without hydroxyl and alkyl substituents. Because of the existence of these branches, the polymer molecules cannot attain a planar molecular configuration as the parapolyphenylenes do, and consequently close packing of the branched polymer molecules does not occur, and the extremely high van de Waals forces, which are noted in the para polymer, are not present. The branched polyphenylenes of this disclosure are thus fusible and tractable. They also have carbon:hydrogen atom ratios of and about 1.5, as indicated.

For many applications, in the art of coatings, and in the art of molding and fabricating laminated structures of high thermal stability, it is essential to use high temperature stable aromatic polymers having a proper molecular weight. At the same time, for proper application, it is essential that the polymer solids be fusible and that they be soluble in selected organic solvents. The exceptional characteristics of the polyphenylene polymers claimed herein is the possession of four properties simultaneously:

(1) They have excellent thermal stability upon curing, exhibiting negligible weight loss between 400–500° C. and high thermal stability at higher temperatures up to 600° C. in inert atmospheres;

(2) They are commercially useful polymeric solids and have mean molecular weights desirably ranging between 1000±500 and 4000, and preferably are utilized in the soluble and tractable range of molecular weight of about 800 to about 3000;

(3) They are sufficiently soluble in certain common organic solvents, and mixtures thereof, selected from the group consisting of xylene, halobenzenes such as chlorobenzene, bromobenzene, 1,2-dichlorobenzene, and 1,2,4-trichlorobenzene, and chloroform, toluene, tetrachloroethane, and trichloroethylene, especially when hot, with sufficient retention in solution and dispersed form in a partially copolymerized state with a curing material to permit their use in lacquers and varnishes; and (4) They are fusible and flow sufficiently at temperatures between 120±20° C. and 400° C. to permit them to be molded under heat and pressure.

It is this combination of properties, plus the fact that these polymers can readily be prepared in solids or solution form, from the monomers, in satisfactory yields, and utilized in combination with a curing agent, which makes them unique and constitutes a significant advancement over the prior art. This desirable combination of properties is a direct result of the choice of monomers and the method of polymerization, as herein described. A method for utilizing these branched phenylene polymers to fabricate coating compositions, laminated objects and subsequently to cure the polymers is disclosed in the herewith filed applications, as indicated. Useful objects or products produced therefrom include coating and laminating compositions, including molding of electrical insulators, rocket nozzles, and structural materials therefrom which are required to withstand high temperatures. In addition, the tractable and fusible polyphenylene resins herein described are used in combination with the curing agent therefor and other resinous material, including infusible and non-tractable polyphenylene resin-out material incorporated therewith, as disclosed in the copending applications of Norman Bilow, entitled "New Resin Compositions and Method of Preparation," Ser. No. 665,284 (abandoned, now C.I.P. Ser. No. 104,779); and "Process for Preparing Improved Phenylene Polymer Lacquers and Products," Ser. No. 665,286 (Pat. No. 3,560,428).

Accordingly, it is an important object of this invention to provide a method for producing commercially useful, tractable, and fusible phenyl- and biphenyl branched phenylene polymer solids in the molecular weight range of 1000±500 to about 5000, and preferably about 500 to 3000; which when cured, are resistant to high temperatures, and before curing are soluble in certain solvents and are fusible and useful in providing coating, molding and laminating compounds, in combination with suitable curing agents.

It is another object of this invention to provide fusible, soluble solids of polyphenylene polymers, having an average C:H atom ratio on the order of 1.5 and which in combination with a curing material therefor are curable to provide high temperature stable polymers having utility in various applications such as in coatings and in the production of molded or laminated objects.

Additional objects will become apparent from the following description, which is given primarily for purposes of illustration, and not limitation.

Stated in general terms, the objects of this invention are attained by polymerizing aromatic and phenylene monomer compounds substantially without aliphatic groups, as biphenyl, ortho- and meta-terphenyls, quaterphenyls, mixtures thereof, and mixtures of same with monomers or polymers of not more than 5 aromatic rings, and preferably the ortho-terphenyl, meta-terphenyl, 1,3,5 - triphenylbenzene, isomers and mixtures thereof, either as such, or in admixture or in combination with other low molecular weight aromatic monomers and/or phenylene oligomers or polymers and mixtures of the same with not more than and preferably less than 5 aromatic rings, using the combination of a strong anhydrous Lewis acid catalyst and a suitable oxidizing agent, or a suitable admixture thereof, of one or more catalysts and one or more oxidizing agents, and utilizing the resultant products or preferably extracting the desired soluble and fusible polymers, as hereinafter described.

A preferred Lewis acid catalyst is anhydrous aluminum chloride. However, less preferably, other anhydrous metal halides which are also strong Lewis acid catalysts such as substantially anhydrous ferric chloride, aluminum bromide, aluminum iodide, and mixtures of the same, and mixtures of the same with aluminum chloride may be used. The preferred catalyst mixture is an aluminum halide as aluminum chloride and ferric chloride, which considerably reduces the cost of manufacture. Still, less preferably, other catalysts as substantially anhydrous tantalum pentachloride, antimony pentachloride, gallium tribromide, zirconium tetrachloride, mixtures of the same, including mixtures thereof and one or more in mixture with the preferred aluminum halide, and/or ferric chloride, may be used. As the oxidizing agent, anhydrous cupric chloride is preferred for use with anhydrous aluminum chloride for effecting efficient production of the soluble and tractable polyphenylene polymers embodied herein. Less preferably, anhydrous ferric chloride serves as an oxidizing agent as well as the catalyst, or otherwise other suitable Lewis acid catalyst and oxidant combination may be utilized. Such oxidizing agents, with or without oxidizing material, as air and oxygen, in a gaseous state, as disclosed in the cofiled application of John B. Rust, Norman Bilow, and Abraham L. Landis, entitled, "Fusible, Soluble Aromatic Polymers and Process of Making Same," Ser. No. 665,265 (Pat. No. 3,565,832), may be used. Other less preferred oxidizing agents, of the character of cupric bromide, silver oxide, vanadium pentoxide, cupric nitrate, cupric acetate, cupric sulfate, and the like, and mixtures of one or more of the same including cupric chloride, air or oxygen, in combination with one or more Lewis acid catalysts, may be utilized. A preferred catalyst and oxidant mixture of economical value has been discovered in using the combination of ferric chloride with reduced amounts of aluminum chloride and cupric chloride, with maintenance of stoichiometric relationship of catalyst and oxidant values.

While many applications and uses may be found therefore, the resulting polymer preferably is cured by further polymerization with different acid catalyst and curing agent. For example, such curing agent is preferably a mutually solvent soluble aromatic, non-phenolic material preferably of the character of a telomer or polymer of an aromatic polymethylol compound as para-xylylene glycol or α,α'-dihydroxy-p-xylylene, prepared in the presence of an acid catalyst, such as p-toluenesulfonic acid or other suitable acid catalyst. Such catalyst, as p-toluenesulfonic acid-type catalyst, preferably remains in the prepolymer and promotes the cross-linking reactions which occur during the curing operation. Otherwise, an initial addition of catalyst curing agent combination may be in an amount sufficient to effect the prepolymerization with subsequent addition of more curing agent (catalyst and aromatic polymethylol material) to subsequently effect curing of the polyphenylene, with or without the addition of other material in combination or mixed therewith.

As indicated, the telomer or polymer is a preferred form; however, the agent forming the prepolymer, such as 1,3- or 1,4-xylylene glycol, and the like may be mixed with the polyphenylene material, in monomer or prepolymer form, and including a strong organic acid polymerization catalyst, as p-toluenesulfonic acid monohydrate, and the combination polymerized or cured in situ to illustrate a useful application of the polyphenylenes in making a lacquer and molding composition. Other curing agents such as polyfunctional disulfonic and trisulfonic acids and derivatives including mixtures and combinations of such acids and other acids may be utilized to effect curing of the polyphenylenes in lacquer and plastic form.

The following are non-limiting examples illustrating the preparation of polyphenylene compositions and products, including their method of preparation, from biphenyl, terphenyls, triphenylbenzene, mixtures of same, and mixtures of the same with other monomers and polymers of not more than 5 aromatic rings, affording fusible and soluble (tractable) polyphenylene polymers useful in the arts for preparing improved heat resistant varnish, lacquers, paints, laminating, molding, and fabricating compositions, per se, or in admixture with other resin or resin forming material, the said fusible and tractable polyphenylene polymers being heretofore unknown, as such, or not available for such useful applications.

As herein exemplified, the starting monomers are preferably selected from the group consisting of biphenyl, ortho- and meta-terphenyls, the 2,2'-, 3,3'-, 2,3'-, 2,4'-3,4'-diphenylbiphenyls, the 1,2,3-, 1,2,4-, and 1,3,5-triphenylbenzenes, mixtures thereof, and mixtures thereof with other aromatic material as monomers and phenylene oligomers and polyphenyls with not more than five aromatic rings present in a lesser portion than said starting monomer material. Less preferably, but, if desired, as illustrations of said other aromatic monomer material, a small amount of benzene up to about ⅓ by weight may be used with the above. If too much benzene is used, an intractable material is obtained. The para monomer is not adaptable to being polymerized, per se, for producing the desirable fusible and tractable polyphenylene polymers, but less preferably may be present in trace to limited amounts in the monomer mixture, or present in a polymer mixture with the above polymerized monomers, as a combination mixture, with retention of the majority portion of the desirable polymers in predominately tractable, fusible and curable form. In the polymerization of the above, there may incidentally occur some fused ring structures due to cyclization and which, if present, are also representative of other aromatic monomers, oligomers, polyphenyls and mixtures thereof which appear not to be detrimental in the partial polymerization and curing of the soluble and fusible polymers.

EXAMPLE I

A mixture of m-terphenyl (230 g., 1.0 mole), biphenyl (77 g., 0.5 mole) benzene (55 g., 0.7 mole), and anhydrous cupric chloride (807 g., 6.0 moles) is prepared and heated to 165° C. in an oil bath. While stirring continuously, anhydrous aluminum chloride (187 g.) is gradually added to the reaction mixture over a two-hour period. The mixture is then cooled, pulverized, and additional aluminum chloride (67 g.) is added. It is then reheated at 165° C. for an additional 45 minutes.

The crude polymer is thoroughly cleaned by treatment with concentrated hydrochloric acid (12 N), then 6 N hydrochloric acid, and finally water. The cleaning may be effected by first treating with 6 N then 12 N, or either or both, as desired. After drying, the product weighs 355 grams. Unreacted monomers and low molecular weight oligomers (≃210 grams) were extracted from the crude polymer by continuous extraction with hot benzene. The lower molecular weight polymer fraction extracted by the benzene had a melting point of about 120°±20° C. Continuous extraction of the benzene-insoluble residue with hot bromobenzene, at and near its boiling point, yields polymer (69 g.) having a mean molecular weight of about 1500 and melting at 190–220° C. If 1,2,4-trichlorobenzene is used in the second extraction, however, the yield of polymer is 90–100 grams, and the polymer has a mean molecular weight of about 2000, and melts at 220–250° C.

Another example, utilizing the above method and composition increasing the benezene portion to 117 g. (1.5 moles), provided soluble polymers of substantially the same character melting at 190°–250° C.

As hereinafter described, the preferred selected polyphenylene polymers can be cured, as defined, to obtain high temperature resistant coatings, laminating and plastic material. The low molecular weight extracted fractions, or the mixture, may likewise be modified by the addition of the catalyst and aromatic polymethylol compound in monomeric or polymeric form, and partially heat cured to form a lacquer or thermosetting thermoplastic upon careful removal of the solvent before heat curing. This cured resin does, however, have a lower degree of thermal stability than the preferred thermosetting cured higher polymers.

As illustrated in the above example, a slight to small amount of benzene, not in excess of ⅓ of the monomer mixture by weight, may be included in the reaction mixture, as its presence does not appear to interfere in the production of the soluble and fusible polyphenylene polymers. A condition for its use, if added, is that the reaction is carried out at the boiling point, preferably under reflux conditions, wherein the amount of benzene portion present in the reaction mixture itself is reduced and when the vaporized benzene is condensed and returned, it also returns other monomers or polymers which may have sublimed and thereby serves to improve the yield of polyphenylene polymers. As generally provided, the reaction is preferably without the presence of benzene. However, under proper control conditions, as above indicated, the reaction compositions may contain some benzene portion.

EXAMPLE II

A mixture of 46 g. (0.2 mole) ortho-terphenyl and 30.8 grams (0.2 mole) biphenyl and 108 g. (0.8 mole) anhydrous cupric chloride was heated to 135° C. While stirring continuously, 145 grams (1.1 moles) anhydrous aluminum chloride was added in small portions over a one-hour period. Heating then was continued for 3¼ hours at temperatures varying between 158°–180° C. The inorganic salts were removed by several washings with 6 N hydrochloric acid, followed by several water washes. The removal may be accomplished using from 6 N to 12 N hydrochloric acid or using 12 N hydrohloric acid alone, followed by water washes. After extracting the washed product continuosuly in a Soxhlet extractor with a boiling mixture of benzene (15–20%) in cyclohexane for two days, the product was then extracted continuously with hot chlorobenzene, at and near to boiling, for one day. The chlorobenzene solution was concentrated to a small volume and the polymer (10.8 g.) was precipitated with cyclohexane. This polymer fraction melted at 180–220° C.

EXAMPLE III

Anhydrous ferric chloride (97.3 grams, 0.6 mole) was added in portions to a stirred mixture of meta-terphenyl (34.5 grams, 0.150 mole) and biphenyl (23.1 grams, 0.150 mole) over a period of one hour. The temperature was maintained between 135° C.–170° C. during the mixing. Heating was continued for four hours after all of the ferric chloride had been added. The crude product was then repeatedly washed with 6 N to 12 N hydrochloric acid and with water. After drying, it was further purified by continuous extraction with cyclohexane and with methanol.

The portion of the product which was insoluble in cyclohexane and methanol was then extracted continuously with xylene for a period of three days. When the xylene solution cooled, 6.2 grams of polyphenylene precipitated. It was collected by filtration and found to have a softening range of 180–285° C. The xylene-insoluble polymer fraction was re-extracted with hot bromobenzene and yielded 2.3 grams of additional fusible polymer.

EXAMPLE IV

A mixture of ortho-terphenyl (200 g., 0.87 mole) and anhydrous cupric chloride (234 g., 1.74 mole) was heated to 150° C. while stirring continuously. Anhydrous aluminum chloride (116 g., 0.87 mole) was added periodically over a two-hour period while maintaining the temperature at 150±10° C. Additional cupric chloride (117 g., 0.87 mole) was then added in portions over the next three hours while maintaining the temperature at 160±10° C. Upon completion of the reaction, the crude product was thoroughly washed with concentrated hydrochloric acid, then dilute acid, and finally water. After drying, the crude polymer was continuously extracted with boiling benzene in a Soxhlet extractor for four days. This procedure removes low molecular weight products. After completion of the benzene extraction, the crude polymer was continuously extracted with boiling 1,2,4-trichlorobenzene. That polymer fraction which was soluble in the trichlorobenzene weighed 67 grams (33% yield) and melted at 220–240° C.

Some slight variation in the above process provided by the additional cupric chloride in an amount of 23.4 gm. (0.17 mole) produced a soluble polymer fraction of 62.6 grams (31.5% yield) of polyphenylene polymers which melted at 235–250° C.

It is generally true that if the low molecular weight fractions (below 500) are not removed from the higher polymers by benzene or other suitable solvent, the polyphenylene has a highly inferior thermal stability. The purification process is thus extremely important. However, where application permits, this does not exclude the advantageous use of the lower fusible and tractable polymer products, having a polymer weight on the order of 500–800 and a melting point on the lower order of 120±20° C., in combination with a suitable curing agent, for lacquer, paint, enamel and plastic use.

EXAMPLE V

A mixture of biphenyl (150.0 g.) and cupric chloride (269 g.) was heated in a silicone oil bath to 100° C. while stirring continuously. Anhydrous aluminum chloride (12.8 g.) was added in small portions over a five-minute period. Within ten minutes the mixture became very viscous and difficult to stir. During the course of the reaction, the temperature was allowed to rise gradually from 100° C. to 150° C. Upon completion of the reaction, the reaction mixture was cooled, ground to a powder, then treated with hot concentrated hydrochloric acid. It was then washed with 6 N to 12 N hydrochloric acid and finally with water. Unreacted monomers were then removed in part by two washes with hot methanol. The solid product then was again washed with acid and then again with methanol. After air drying, the low molecular weight telomers were removed by a continuous extraction with boiling benzene for three days. After the benzene extraction, the high molecular weight fusible polymer was separated from the infusible polymer by extraction with hot bromobenzene. After removal of the bromobenzene from the polymer solution, the polymer was found to weigh 21 grams (14% yield). It softened between 192° C. and 240° C. and had a molecular weight of 2240 as determined by ebullioscopic methods.

A significantly higher yield of polymer is obtained if 1,2,4-trichlorobenzene is used in place of bromobenzene.

EXAMPLE VI

Branched, fully aromatic polyphenylene resins were prepared from m-terphenyl and biphenyl mixtures using ferric chloride, as in Example III, in one instance and in another instance aluminum chloride-cupric chloride as catalyst-oxidant combination and made according to the process of Example I. The resins, had a mean molecular weight in the range of 1000–1500, were insoluble in boiling solvent consisting of 20% benzene and 80% cyclohexane, were soluble in hot bromobenzene, and melted in a range of 190–220° C.

EXAMPLE VII

A branched, fully aromatic polyphenylene resin was prepared according to the process of Example I from 1.5 moles of meta-terphenyl and 1.5 moles of biphenyl using 2.3 moles of aluminum chloride as catalyst and 6 moles of cupric chloride as oxidant. The resin was characterized as being in the molecular weight range of 1000±500–2500, with the desirable portion insoluble in boiling 20% benzene-80% hexane solvent, but soluble in boiling bromobenzene and having a melting range of 188–208° C.

EXAMPLE VIII

A branched, fully aromatic polyphenylene resin was prepared according to the above process with a mixture of 7 moles of meta-terphenyl and 6 moles of biphenyl using 13 moles of aluminum chloride as catalyst and 26 moles of cupric chloride as oxidant. The resin was characterized as being insoluble in boiling 20% benzene-80% hexane solvent, but soluble in boiling chlorobenzene; having a melting range of 180–210° C. and molecular weight in the range of 1000±500 to about 2500.

EXAMPLE IX

A branched, fully aromatic polyphenylene resin was prepared according to the process of Example IV from 1.5 moles of meta-terphenyl and 3 moles of biphenyl using 2.25 moles of aluminum chloride as catalyst and 4.5 moles of cupric chloride as an oxidant. The resin was characterized as being in the molecular weight range of 1000±500 to on the order of 3000, with the preferred portion being insoluble in boiling 20% benzene-80% hexane solvent, but soluble in boiling chlorobenzene and having a melting range on the order of 180–210° C. The preferred fraction had a carbon:hydrogen atom ratio of 1.62.

EXAMPLE X

A branched, fully aromatic polyphenylene resin was prepared according to the above process from 2 moles of meta-terphenyl and 2 moles of biphenyl using 3 moles of aluminum chloride as catalyst and 8 moles of cupric chloride as oxidant. The resin was characterized as being in the molecular weight range of 1000±500 to about 3000, with the preferred portion being insoluble in boiling 20% benzene to 80% hexane solvent, but soluble in boiling chlorobenzene and having a melting range of 188–210° C.

It is recognized that in the provision of the polyphenylenes, herein described, there may be some incidental cyclization causing some fused ring structure to occur in one or more of the processes herein detailed and described. When this occurs, the carbon to hydrogen atom ratio is slightly above 1.5 and within the definition of the polyphenylenes, as herein provided.

EXAMPLE XI

A branched, fully aromatic polyphenylene resin was prepared according to the above process from 5 moles of meta-terphenyl and 5 moles of biphenyl using 10 moles of aluminum chloride as catalyst and 20 moles of cupric chloride as oxidant. The resin which was insoluble in boiling 20% benzene—80% hexane solvent and soluble in boiling chlorobenzene had a melting range of 185–220° C. and a molecular weight range on the order of 1000±500 to about 2500 or more.

In providing the above and herein disclosed method and products, the order of mixing of the monomers, catalyst and oxidant may be effected as indicated or by first mixing the reactants with the catalyst and adding the oxidant, or by mixing the catalyst and oxidant and adding the mixture to the monomers, or vice versa. As described, the halogenated solvent extracted portion is preferred. However, for some applications, after removal of the unpolymerized monomers, or unreacted portion, and filtering out the solids, the solvent and fusible portion may be utilized. On the other hand, as disclosed in the copending application of Norman Bilow entitled, "New Resin Compositions and Method of Preparation," Ser. No. 665,284 (abandoned, now C.I.P. Ser. No. 104,779), the insoluble solids may be utilizable. Less preferably, for some commercial applications or where reduced properties are permissible, the addition of trace to small amounts of benzene may be added as an example of an oligomer or monomer and polymers of not more than 5 aromatic rings. In commercial production, it is preferred to remove the unreacted monomers and lower polymers from the soluble and fusible polyphenylenes, with or without the subsequent removal of some insoluble polymers for sale of the raw material in the dry state, thus eliminating the last steps of solvent extraction and drying, if desired.

The following examples are provided to illustrate new and applicable uses for polyphenylene polymer products produced by the method as herein described:

EXAMPLE XII

M-terphenyl (230 g., 1.0 mole) was melted and heated to 100° C. Anhydrous aluminum chloride (133 g., 1.0 mole) was then added carefully and the temperature was adjusted to 110° C. Anhydrous cupric chloride (269 g., 2.0 mole) was added in portions over a two hour period. The reaction temperature was maintained between 110–130° C. and after 3 hours the mixture was cooled and washed repeatedly with hydrochloric acid (12 N). When all traces of copper were removed, the polymeric product was thoroughly washed with water.

After drying the polymer, it was extracted exhaustively for 60 hours with a mixture of benzene (15%) and naphtha (85%) to remove unreacted monomers and very low telomers. When this extraction was completed, the polymer was extracted exhaustively with boiling chlorobenzene. The chlorobenzene-soluble polyphenylene weighed 98 grams, melted at 170–220° C. and had a carbon:hydrogen atomic ratio of 1.58.

EXAMPLE XIII 1,3,5-triphenylbenzene (51.1 g., 0.167 mole) and anhydrous cupric chloride (44.8 g., 0.333 mole) were mixed in a resin kettle heated by means of an oil bath, and anhydrous aluminum chloride (45 g., 0.34 mole) was added in portions over a period of 1½ hours. At the start of the reaction, the temperature of the reaction mixture was 176° C. (triphenylbenzene melts at 170° C.). An extremely vigorous reaction occurred with the addition of the first portion of aluminum chloride (2 g.). Copious quantities of gas were evolved, and the mixture foamed up and quickly turned dark. After the initial reaction, the evolution of hydrogen chloride was very slow and the further addition of aluminum chloride apparently had little effect. The reaction was continued for a total of 3 hours, with the temperature varying between the limits of 136° and 182° C. The mixture remained fluid and was stirred throughout the reaction. When heating ceased, there was essentially no more evolution of gas.

After cooling, the product was ground in a mortar and extracted and washed on the filter as follows: (1) with concentrated hydrochloric acid (11) and washed with more acid (22 ml.) and with water; (2) with boiling concentrated hydrochloric acid (500 mole) and washed with acid (100 ml.) and with water; (3) twice with boiling methanol (500 ml. ea.) and washed with methanol and with water; (4) with boiling concentrated hydrochloric acid (500 ml.) and washed with water; (5) with boiling methanol (500 ml.) and washed with methanol. The methanol solutions were combined, and water was added to precipitate 8.78 g. (17.3% yield) of unreacted monomer or polymer of a very low molecular weight.

The dark, greenish-brown polymer (39.8 g.) was thoroughly dried and extracted with benzene for 1 day in a Soxhlet extractor. After distilling most of the solvent from the extracts, the product was precipitated with hexane and dried in a vacuum oven a 100°–110° C. This polymer fraction weighed 15.1 g., corresponding to a 29.8% yield, and melted at 143–158° C.

EXAMPLE XIV

A mixture of 75 milliliters chloroform, 7.5 grams $\alpha,\alpha$ - dihydroxy - p - xylene (p-xylylene glycol) and 2.25 grams p-toluenesulfonic acid monohydrate was refluxed for 40 hrs. Water was removed continuously from the reaction mixture by distilling the water-chloroform azeotrope and removing the water from the condensate in a trap. Traces of undissolved solids were removed from the prepolymer solution by filtration, and this solution was combined with a solution of 15.0 grams of the soluble and tractable phenylene polymers, as desired, in tetrachloroethane. The lacquer was concentrated by boiling off excess solvent until it contained between 6 and 7% solids by weight. This lacquer was used to coat a glass fabric, which, after evaporation of the solvent, was used to prepare a laminate. Curing was accomplished in about two hours in a mold at 260° C. under a pressure of 10,000 pounds per square inch. Otherwise, fabrication and curing is preferably accomplished as provided in the next example, and if not molded to the shape and configuration desired, the molded product can be cut, ground and polished as desired. Otherwise, by carefully boiling off or removing the solvent without curing, the polyphenylene and curing agent composition provides improved fusible thermosetting resin material, or a resoluble and redispersible resin, with or without inclusion of the lower and/or higher molecular weight fractions, in whole or part. Thus, as contemplated herein, the polyphenylene reaction mixture, when freed of catalyst and oxidant materials, may provide a commercially utilizable composite curable mix which does not have the benefit of the preferred extracted polymers.

EXAMPLE XV

Polyphenylene (30 g., M.P. 160–180° C.), p-xylylene glycol (15 g.) and p-toluenesulfonic acid monohydrate (5 g.) were slurried in chloroform (200 ml.) and heated at reflux for 19 hours. During this time approximately 1.6–2.0 ml. of water were evolved and collected. The cooled reaction mixture was used with no further treatments and provided a high temperature resistant coating material. For example, the prepared mixture, when used to coat and impregnate cloth and particularly to fabricate polyphenylenecarbon cloth laminates, was found to mold and cure satisfactorily. The consistency of the solution phase was dependent upon the amount of solvent before curing.

By the preferred method of fabrication, the impregnated laminates are stacked and cured under pressure of 500 p.s.i. (500–3000 p.s.i.) at a cure temperature of 300°–400° F. for a period of about 2 hours. The laminate is then postcured as follows:

(1) 18 hours at 274° F.
(2) 108 hours during which the temperature is programmed from 275° to 600° F.
(3) 1 hour at 600° F.
(4) Gradual cooling in an oven to 200° F. The curing is preferably effected in an inert atmosphere as argon, helium, nitrogen, or the like.

EXAMPLE XVI

A sample of the above solution containing about 7% to 8% semi-cured polyphenylene solids was mixed with filler material (about 2% to 3% zinc oxide) in a conventional mixing mill. When applied as a coating composition, the mixture was slow drying and cured faster when heated under a temperature condition as heretofore indicated. Other samples of filler material as ferric oxide, titanium oxide and the like were mixed in similar solutions of the semi-cured polyphenylene vehicles and provided excellent heat curable, heat resistant coatings. The above does not exclude the use of other suitable fillers and the like, or other materials providing extended usage of the polyphenylene material herein described.

Whereas there has been described essentially the preferred soluble and fusible production and extraction of the most desirable polymer solids, effected by a reaction of organic monomers and polymers with strong anhydrous Lewis acid catalyst material and oxidizing material which is capable of oxidizing the reaction product to a fully aromatic polymer, the low molecular weight portions of the reaction monomers and polyphenylene polymers may be utilized with reduced efficiency, and the insoluble solids are also utilizable, as by heating in solution with the lower molecular weight monomers and polymers, as heretofore indicated. In addition, in the reaction stage for producing the polyphenylene polymers as described, it appears that the top temperature level of the reaction, as in the above example, can be reduced from about 5° to 45° C. or to about 130°–135° C. with increased efficiency in production yields and commercial manufacture of essentially fusible and tractable polyphenylene polymers in preferred molecular weight range of 1000±500 to about 3000, with a carbon:hydrogen ratio of and about 1.5.

EXAMPLE XVII

In this experiment, a mixture consisting of biphenyl (1.50 m.) and meta-terphenyl (1.50 m.) was heated to 120° C. with an oil bath. Into the mixture was added aluminum trichloride (4.00 m.). When the mixture had been thoroughly equilibrated to the temperature of the oil bath, anhydrous ferric chloride (3.00 m.) was added and the contents were stirred. Anhydrous cupric chloride (1.00 m.) then was added in small increments. After the addition, the reaction mixture was stirred for 60 hours, at the end of which time the mixture was very fluid. Working up the reaction mixture in the usual manner yielded the following fractions upon slurry extractions:

|  | Percent |
| --- | --- |
| 15% benzene-85% naphtha soluble | 10.4 |
| Chlorobenzene soluble | 32.0 |
| Chlorobenzene insoluble | 57.6 |

EXAMPLE XVIII

In this experiment a mixture consisting of biphenyl (0.75 m.) and meta-terphenyl (0.75 m.) was heated to 120° C. with an oil bath. Into the mixture was added aluminum trichloride (2.00 m.). When the mixture had equilibrated, anhydrous cupric sulphate (2.00 m.) was added in small increments. There was a fairly heavy evolution of white fumes during this addition. After allowing the mixture to react at 120° for 20 hours, the reaction mixture was worked up in the usual manner to yield the following fractions:

|  | Percent |
| --- | --- |
| 15% benzene-85% naphtha soluble | 8.3 |
| Chlorobenzene soluble | 42.7 |
| Chlorobenzene insoluble | 49.0 |

EXAMPLE XIX

Biphenyl (1.5 mole, 231 g.) and m-terphenyl (1.5 mole, 345 g.) were melted together at 120° C. and AlCl$_3$ (534 g., 4.0 mole) was then added and stirred in for 15 minutes. Dry FeCl$_3$ (486 g., 3.0 mole) next was added over a 15-minutes period. Dry cupric chloride (1.0 mole, 135 g.) then was added over a 10-minute period. The mixture was stirred for 60 hours. The resultant product was thoroughly washed with concentrated aqueous hydrochloric acid, then collected by filtration and water washed. It was then dried azeotropically with a mixture of benzene (15%) and naphtha (85%). Upon filtration, the insoluble product weighed 593 g. Re-extraction with the same mixed solvent was again carried out and the insoluble portion now weighed 581 g. Two extractions of the polymer with boiling chlorobenzene yielded 106 g. of soluble polymer.

In the above compositions, the soluble and fusible polyphenylenes described are not the insoluble linear para-polyphenylene polymers of the known art, or the reaction products substituted with oxygen and alkyl groups of the known art. Instead, the soluble and fusible aryl substituted polyphenylenes are non-linear branched polyphenylenes containing at least one or more units of nonreduced polymer forming branches of the formula:

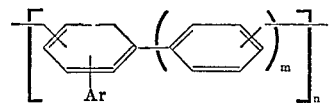

where $m$ is an integer from 0–3, $n$ is an integer of 1 or more and Ar is an aromatic hydrocarbon branch. A relatively lesser portion of the polymers may contain cyclized structural units of the formula:

To provide the best yield of desirable polymerizable, soluble and fusible, branched polyphenylene polymers having the above characteristic moiety, it has been discovered that the above reactions can preferably be carried out at temperatures between 100° C. to 150° C. While some reactions are possible at temperatures of less than 100° C. and over 150° C., the overall preferred extracted products have a thermal stability evidenced by no more than 15% weight loss at 500° C. when tested in an inert atmosphere (nitrogen) and heated at a programmed rate of 6° C./minute, from an initial temperature of 125° C. The polyphenylenes of a molecular weight of 1200 and more have a higher stability and exhibit no more than about 5% weight loss, to about 3%, as the molecular weight increases, under such test conditions.

By the above definition there is excluded herefrom polyphenylene polymer mixtures of essentially such para-phenylene polymers as para-sexi-, para-septi-, para-octi-, para-novi-, phenyl, and higher molecular weight insoluble para-polymer homologues.

Having described the present embodiment of our discovery and improvement in the art, in accordance with the constitutional grant and the patent statutes, it will be apparent that some modifications and variations as herein embodied and as now made available to the art may be made available to the art may be made without departing from the spirit and scope thereof. The specific embodiments above described are given by way of examples illustrative of our discovery and improvement.

We claim:

1. A mixture of substantially soluble and fusible fully aromatic, non-alkylated polymerizable non-linear polyphenylene polymers consisting essentially of one or more non-reduced aromatic polymer forming branches of the formula:

where $m$ is an integer from 0–3, $n$ is an integer of at least 1 or more and Ar is an aromatic hydrocarbon branch of carbon and hydrogen atoms only essentially without hydroxyl and alkyl substituents and is a portion of the following reactant monomer mixture, said polymer:

(a) consisting of a polymerized aromatic monomer mixture containing a preponderant amount of non-para aromatic monomers containing at least two aromatic rings selected from the group consisting of soluble biphenyl, ortho-terphenyl, meta-terphenyl and isometric quaterphenyls including 2,2'-, 2,4'-, 2,3'-, 3,3'-, and 3,4'-diphenylbiphenyl, 1,2,3-, 1,2,4-, and 1,3,5-triphenylbenzene, mixtures thereof, and mixtures of the same with other aromatic material selected from the group consisting of aromatic monomers or aromatic polyphenyls and mixtures of the same, said monomers or polymers having not more than five aromatic rings;

(b) having a C:H atomic ratio on the order of about 1.5 and between 1.43 to about 1.7;

(c) having a halogen content below 3% by weight;

(d) soluble in hot halogenated hydrocarbon solvents;

(e) a melting point of between 120±20° C. and 400° C.;

(f) a molecular weight of from about 500 to about 5000; and (g) having a thermal stability evidenced by no more than 15% weight loss at 500° C. when tested in an inert atmosphere and heated at a programmed rate of 6° C./min. from an initial temperature of 125° C.

2. A polyphenylene according to claim 1 containing a minor amount of other aromatic monomers containing 1 to 5 aromatic rings.

3. A polyphenylene according to claim 1 in which said other monomers are selected from benzene, p-terphenyl and p-quaterphenyl and are present in an amount no more than ⅓ by weight of the monomer mixture.

4. A polyphenylene according to claim 3 in which said other monomers are present in an amount no more than 20% by weight.

5. A polyphenylene according to claim 1 further comprising a portion of cyclized structural units of the formula

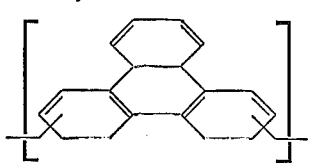

6. A polyphenylene according to claim 1 prepared by the cationic oxidative polymerization of said monomers at a temperature of from about 100° C. to 180° C. in the presence of a strong Lewis acid catalyst and oxidant polymerizing combination.

7. A polyphenylene according to claim 1 prepared by the cationic oxidative polymerization of said monomers at a temperature of from about 100° C. to 150° C. in the presence of a strong Lewis acid catalyst and oxidant polymerizing combination.

8. A method for producing fusible and tractable polyphenylene polymers having a C:H atomic ratio of about 1.5 and between 1.43 to 1.7 and of a molecular weight of about 500 to about 3000 which comprises the steps of:

(a) mixing aromatic hydrocarbon monomers substantially without aliphatic groups selected from the group consisting of biphenyl, terphenyls, quaterphenyls other than the para monomer per se, mixtures of the same, and mixtures of the same with other aromatics with not more than five aromatic rings, with (b) a strong anhydrous Lewis acid catalyst selected from the group consisting of anhydrous aluminum chloride, anhydrous ferric chloride, and mixtures of the same in combination with an oxidizing agent selected from the group consisting of anhydrous cupric chloride, anhydrous ferric chlorides, and mixtures of the same;

(c) heating the mixture in a temperature range of about 100° C. to about 165° C., thereby effecting polymerization of said hydrocarbons, to produce essentially crude tractable and fusible polyphenylenes;

(d) removing the catalyst and oxidant from the reaction mixture;

(e) purifying the crude polyphenylenes by removing the unpolymerized and low molecular weight polymer fractions below about 500 molecular weight therefrom by extraction of the crude polymer with a first solvent; and (f) removing the said 500 to about 3000 molecular weight fusible and tractable polyphenylenes from the reaction mixture by extraction of the residual fraction thereof with a different hot solvent; and (g) recovering said soluble, fusible and polymerizable polyphenylene polymers having a characteristic unit of

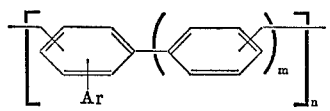

where $m$ is an integer from 0–3, $n$ is an integer of at least 1 and Ar is an aromatic hydrocarbon branch portion of the said reactant monomers.

9. A method for producing fusible and tractable polyphenylene polymers essentially without aliphatic and olefinic groups in the polymers having aromatic hydrocarbon branches consisting primarily of phenyl and/or biphenyl groups on the main polyphenylene chain without hydroxyl and alkyl substituents and further characterized by the following combination of properties:

(a) a carbon to hydrogen ratio of and about 1.5;

(b) a mean molecular weight ranging between 500 and 3000;

(c) thermal stability upon curing and postcuring exhibited by negligible weight loss between 400–500° C. in inert atmospheres;

(d) soluble in hot aromatic solvent material selected from the group consisting of mono, di- and trihalobenzenes, and mixtures of the same;

(e) fusible flow at temperatures between 120° C. ±20° C. and 400° C. sufficient to permit molding under conditions of heat and pressure, which comprises the steps of: polymerizing at a temperature between 90° C. to about 180° C. aromatic hydrocarbon monomers selected from the group consisting of biphenyl, ortho-terphenyl, meta-terphenyl, 2,2'-, 3,3'-, 2,3'- 2,4'- 3,4'-diphenylbiphenyl, the 1,2,3-, 1,2,4-, and 1,3,5-triphenylbenzene, mixtures of the same, and mixtures of the same with other aromatic material with not more than five aromatic rings, in the presence of a strong anhydrous metal halide Lewis acid catalyst capable of polymerizing said monomers in combination with an oxidizing agent capable of oxidizing the polymer reaction intermediate to a fully aromatc polymer product, said Lewis acid catalyst being selected from the group consisting of aluminum chloride, aluminum bromide, aluminum iodide, tantalum pentachloride, antimony pentachloride, gallium tribromide, zirconium tetrachloride, ferric chloride, and mixtures of the same to produce crude fusible and tractable polymerizable polyphenylenes, purifying the said crude polyphenylenes by removing the unpolymerized and low molecular weight polymer fractions therefrom by extraction of the crude polymer with a solvent and removing the said fusible polyphenylene polymers from the remaining crude polyphenylene polymers by extraction of the residual fraction with a hot solvent in which the said fusible polymers are soluble.

10. A method for producing commercially usable, fusible and tractable polyphenylene polymers having phenyl or biphenyl groups substantially without hydroxyl, aliphatic and olefinic groups in the polymer and which are further characterized by the following simultaneous combination of properties:
  (a) a carbon to hydrogen ratio of and about 1.5;
  (b) a mean molecular weight ranging between 500 up to about 5000;
  (c) thermal stability upon curing exhibited by negligible weight loss between 400° C.–500° C. in inert atmospheres;
  (d) soluble in at least one of the hot aromatic mono-, di-, and trihalobenzenes;
  (e) fusible flow at temperatures of 100° C.±20° C. up to about 400° C. sufficient to permit molding under conditions of heat and pressure, which comprises the steps of: polymerizing at a temperature of about 100° C. up to about 150° C. a mixture of unalkylated non-hydroxy aromatic hydrocarbon monomers selected from the group consisting of biphenyl, ortho-terphenyl, meta-terphenyl, isomers of diphenylbiphenyl and triphenylbenzene, mixtures of the same, and mixtures of the same with other aromatic material of not more than five aromatic rings, affecting a polymerization reaction thereof in the presence of a substantially anhydrous Lewis acid polymerization effecting catalyst and anhydrous oxidizing agent combination therefor capable of oxidizing the polymer reaction intermediate, said Lewis acid catalyst being selected from the group consisting of aluminum chloride, aluminum bromide, aluminum iodide, tantalum pentachloride, antimony pentachloride, gallium tribromide, zirconium tetrachloride, ferric chloride, and mixtures of the same removing the catalyst and oxidant, purifying the crude polyphenylenes by removing the unpolymerized monomers and low molecular weight polymer fractions by extraction of the crude polymers with a solvent therefor, removing the said fusible, soluble polyphenylene polymers from the extraction crude polymer in a hot solvent therefor, and recovering the said fusible and tractable polymers.

11. The method of producing essentially fusible and tractable, polymerizable polyphenylene polymers in commercially available bulk form having a carbon to hydrogen atom ratio of between 1.4 and 1.7, a mean molecular weight of 500 to about 3000 and soluble in hot solvent material selected from the group consisting of mono-, di- and trihalobenzene, with fusible flow at temperatures between 120° C.±20° C. and 400° C. comprising the steps of:
  (a) mixing aromatic monomers selected from the group consisting of biphenyl, ortho- and meta-terphenyls, the 2,2'-, 3,3'-, 2,3'-, 2,4'-, and 3,4'-diphenylbiphenyls, 1,2,3-, 1,2,4-, 1,3,5-triphenylbenzenes, mixtures thereof, and mixtures of same with other aromatic material having not more than 5 aromatic rings, with:
    (1) a metal halide polymerization effecting catalyst and an oxidant capable of oxidizing the reaction intermediates to fusible and tractable aromatic polymers having a C:H ratio on the order of 1.5, said metal halide polymerization effecting catalyst being selected from the group consisting of aluminum chloride, aluminum bromide, aluminum iodide, tantalum pentachloride, antimony pentachloride, gallium tribromide, zirconium tetrachloride, ferric chloride, and mixtures of the same;
  (b) heating the mixture between 100° C. and 150° C. for a period of from a few minutes to a few hours, and
  (c) obtaining essentially fully aromatic polyphenylene polymers having phenyl and/or biphenyl groups of said mixed aromatic monomers without hydroxyl and alkyl substituents and soluble in heated solvents selected from the group consisting of xylene, the halobenzenes, chloroform, toluene, tetrachloroethylene, trichloroethylene, trichlorethane, and mixtures of the same.

References Cited
UNITED STATES PATENTS

| | | | |
|---|---|---|---|
| 3,565,832 | 2/1971 | Bilow et al. | 260—2 |
| 3,145,237 | 8/1964 | van Helden et al. | 260—670 |
| 3,320,183 | 5/1967 | Brown | 260—2 H |

OTHER REFERENCES

Kovacic et al., "Journal American Chemical Society," vol. 85 (February 1963), pp. 454–458.

Kovacic et al., "Journal of Organic Chemistry," vol. 29 (January 1964), pp. 100–104.

SAMUEL H. BLECH, Primary Examiner

UNITED STATES PATENT OFFICE
CERTIFICATE OF CORRECTION

Patent No. 3,677,976   Dated July 18, 1972

Inventor(s) Leroy J. Miller and Norman Bilow

It is certified that error appears in the above-identified patent and that said Letters Patent are hereby corrected as shown below:

Col. 12, line 71, the benzene unsaturation symbol in the upper right hand corner of the formula should be placed inside the benzene ring, and the letter "n" placed below the right hand bracket, as follows:

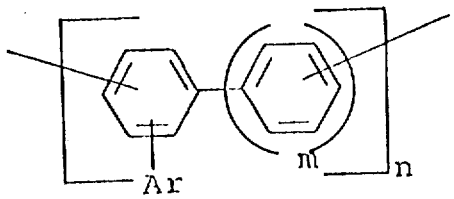

Col. 15, line 5, "between" should be --from about--.

Col. 15, line 36, "extraction" should be --extracted--.

Signed and sealed this 1st day of May 1973.

(SEAL)
Attest:

EDWARD M. FLETCHER, JR.
Attesting Officer

ROBERT GOTTSCHALK
Commissioner of Patents